Patented Aug. 23, 1938

2,128,202

UNITED STATES PATENT OFFICE 2,128,202

PROCESS OF PREPARING COMPOUNDS OF AZOPROTEINS WITH ANTIMONY

Max Bockmühl, Willy Ludwig, and Paul von Mutzenbecher, Frankfort-on-the-Main-Hochst, Germany, assignors to Winthrop Chemical Company, Inc., New York, N. Y., a corporation of New York No Drawing. Application August 18, 1936, Serial No. 96,699. In Germany December 7, 1934

3 Claims. (Cl. 260—113)

The present invention relates to a process of preparing compounds of azoproteins with antimony.

Azoproteins have already been prepared; compounds of azoproteins with antimony have, however, hitherto been unknown. According to this invention these new compounds can be obtained by diazotizing an antimony compound of an aromatic amine and coupling the diazotized product with albumin or by subsequently introducing the antimony into an azoprotein.

As albumin component there may be used serum, the serum fractions, casein, etc.

The resultant antimony compounds of the azoproteins possess valuable chemo-therapeutic properties.

The following examples illustrate the invention:

(1) Antimony compound of tartranilic acid coupled with serum.

3 grams of tartranilic acid of the following composition

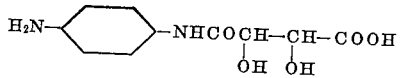

according to Landsteiner (Jour. exp. Med. 50, 1929, page 408) are dissolved in a mixture of 100 cc. of water and 35 cc. of hydrochloric acid of 10 per cent strength, the solution is diazotized with 100 cc. of a N/10 sodium nitrite solution and made up with ice water to 500 cc. 250 cc. of horse serum are mixed with 50 cc. of a sodium carbonate solution of 10 per cent strength and then, while cooling with ice, at first with ⅔ of the dilute diazotate solution. After 1½ hours the remaining ⅓ is added and the whole allowed to stand for 1 hour. During all the time the reaction is kept feebly positive to phenolphthalein with a solution of sodium carbonate. An acid is then added and the precipitate thus produced is centrifuged, dissolved in dilute caustic soda solution and dialyzed in the "Cellophane" tube, until the chlorine ions disappear in the outer water.

70 cc. of this 8 per cent solution are mixed with 35 cc. of a 10 per cent solution of sodium carbonate and a solution of 0.5 gram of antimony trioxide in 8 cc. of 4N-hydrochloric acid is added drop by drop. The solution is then again rendered feebly alkaline and dialyzed in order to completely purify it.

(2) 0.3 gram of tartranilic acid is dissolved in water, neutralized with caustic soda solution and boiled for some time with 0.3 gram of antimony trioxide. The supernatant solution is now filtered from the undissolved antimony trioxide, acidified with hydrochloric acid and diazotized, while cooling with ice, by means of a solution of sodium nitrite. 25 cc. of horse serum are mixed with 10 cc. of 2N-solution of sodium carbonate and the diazonium solution is added. After 3 hours the azoprotein is precipitated with an acid, dissolved in dilute caustic soda solution and dialyzed against distilled water. The solution which after the dialysis is concentrated to 60 cc. contains 2.5 per cent of dry substance and 0.012 per cent of antimony.

(3) Serum protein-4-azo-2-chlorobenzene-1-stibonic acid.

3.6 grams of 4-acetylamino-2-chlorobenzene-1-stibonic acid are mixed with 50 cc. of a 1.5N-caustic soda solution, kept for ¾ hour on a steam bath at a temperature of 90° C. until the solution has become clear; it is then cooled, mixed with an excess of hydrochloric acid and diazotized, while cooling with ice, with 100 cc. of a N/10-solution of sodium nitrite. 250 cc. of serum are mixed with 100 cc. of a 2N-solution of sodium carbonate and the diazonium solution is gradually added while strongly stirring. The azoprotein is obtained as a yellow-red grainy precipitate.

(4) Antimony compound of casein-azo-tartranilic acid.

3 grams of tartranilic acid are dissolved in a mixture of 100 cc. of water and 35 cc. of hydrochloric acid of 10 per cent strength; the solution is diazotized with a N/10-solution of sodium nitrite and made up with ice water to 500 cc. 15 grams of casein are dissolved in 300 cc. of a 3 per cent solution of sodium carbonate and then, while cooling with ice, at first mixed with 300 cc. of the diazotate solution. After 1½ hours the remaining part is added and the whole allowed to stand in ice for 1 hour, the reaction being kept feebly positive to phenolphthalein. The precipitation by means of acid, the dialysis and the introduction of the antimony are carried out as described in Example 1.

(5) Serum albumin-4-azo-2-chlorobenzene-1-stibonic acid.

The saponification of the acetyl compound of the free acid and the diazotization are carried out as described in Example 3. The diazonium solution is gradually added to 300 cc. of a 5 per cent solution of serum albumin which contains 10 grams of anhydrous sodium carbonate. When the coupling is finished the azoprotein is precipitated with the aid of an acid.

We claim:
1. Process of preparing compounds from azo-proteins and antimony which comprises diazotizing an amine of the benzene series, coupling the diazotate with albumin and causing the product thus obtained to react with an antimony compound.

2. Process of preparing compounds from azo-proteins and antimony which comprises diazotizing an amine of the benzene series, coupling the diazotate with serum and causing the product thus obtained to react with an antimony compound.

3. Process of preparing compounds from azo-proteins and antimony which comprises diazotizing an acid of the formula

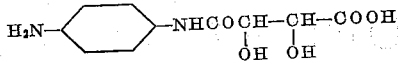

coupling the diazotate with horse serum and causing the product thus obtained to react with antimony trioxide.

MAX BOCKMÜHL.
WILLY LUDWIG.
PAUL von MUTZENBECHER.